United States Patent [19]

Tsunekawa et al.

[11] 4,083,059

[45] Apr. 4, 1978

[54] AUTOMATIC EXPOSURE CONTROL SYSTEM FOR FLASH PHOTOGRAPHY

[75] Inventors: Tokuichi Tsunekawa, Yokohama; Zenso Nakamura, Urawa; Tetsuya Taguchi, Kawasaki; Masanori Uchidoi, Yokohama; Hiroshi Aizawa, Machida; Takashi Uchiyama, Yokohama, all of Japan

[73] Assignee: Canon Kabushiki Kaisha, Tokyo, Japan

[21] Appl. No.: 717,950

[22] Filed: Aug. 26, 1976

Related U.S. Application Data

[63] Continuation of Ser. No. 615,365, Sep. 22, 1975, abandoned.

[30] Foreign Application Priority Data

Sep. 26, 1974 Japan .................................. 49-111302

[51] Int. Cl.$^2$ ............................................. G03B 15/03
[52] U.S. Cl. ........................................ 354/149; 354/34; 354/60 F; 354/139
[58] Field of Search ................ 354/27, 32, 34, 35, 354/50, 51, 60 F, 139, 145, 146, 149, 258, 129

[56] References Cited

U.S. PATENT DOCUMENTS

| 3,731,601 | 5/1973 | Matsuzaki | 354/34 |
| 3,886,568 | 5/1975 | Yazaki et al. | 354/139 |
| 3,893,143 | 7/1975 | Taguchi et al. | 354/258 |
| 4,016,575 | 4/1977 | Uchiyama et al. | 354/139 |
| 4,021,824 | 5/1977 | Uchiyama et al. | 354/139 |

*Primary Examiner*—Russell E. Adams
*Attorney, Agent, or Firm*—Toren, McGeady and Stanger

[57] ABSTRACT

In a camera provided with a day-light exposure range and with a flash exposure range, an automatic exposure control system for controlling the iris of the camera in accordance with a computed exposure value and a preselected shutter time is associated with a flash exposure time range bracketing device in order to insure that the formation of a correct flash exposure aperture is effected with automatic selection of one of the bracketed exposure times despite an accidentally incorrect setting of the shutter dial of the camera which may be encountered particularly when the day-light exposure range is to be left for the flash exposure range without the necessary manipulation of the shutter dial therefor. The bracketing device of the present invention comprises three timing circuits in combination with a selector responsive to the position of the shutter dial for selecting either the first, or the second, or the third timing circuit for cooperation with an electronic switch controlling the period of actuation of the camera shutter when the shutter dial is set either within, or on the faster side of, or on the slower side of a possible flash exposure time range respectively, whereby the resultant actuation period is equal to either the shutter time preselected on the shutter dial, or the faster limit of, or the slower limit of the flash exposure time range respectively.

28 Claims, 6 Drawing Figures

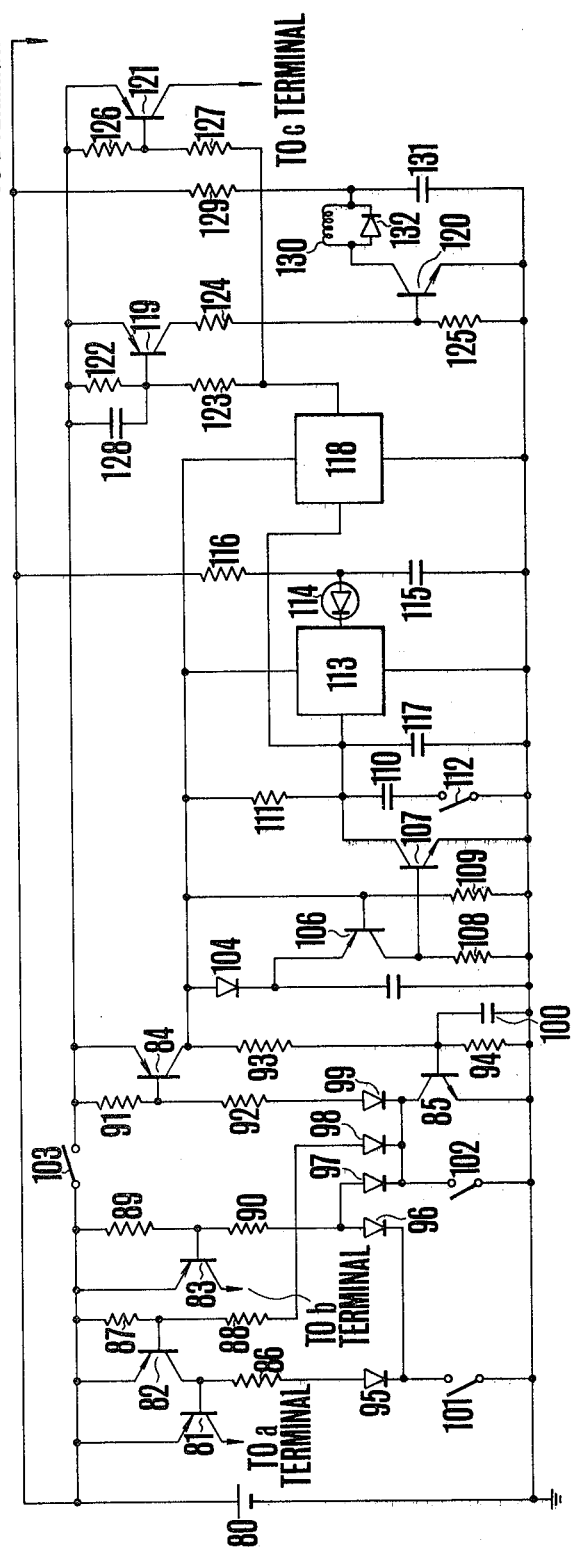
F I G. 2B

AUTOMATIC EXPOSURE CONTROL SYSTEM FOR FLASH PHOTOGRAPHY

This is a Continuation of Application Ser. No. 615,365 filed Sept. 22, 1975, now abandoned.

BACKGROUND OF THE INVENTION

1. Field of the Invention

This invention relates to an automatic exposure control system for a camera provided with a day-light exposure range and with a flash exposure range, and more particularly, to a flash exposure time range bracketing device incorporated in the automatic exposure control system in order to insure that the formation of a correct flash exposure aperture is effected with a shutter time which is involved in a possible flash exposure time range and which is either dependent on, or independent, of the setting of shutter dial when the shutter dial is in a position providing a shutter time within or outside the above-identified range respectively.

2. Description of the Prior Art

It has been the practice of the prior art in making flash exposures between day-light exposure to manually readjust the shutter dial of a camera to a particular shutter time, for example, 1/60 second or 1/125 second at which it is assured that the shutter slit has an effective area large enough to unblock the entire area of one film frame. The constantly necessary readjustment of the shutter dial constitutes, for the photographer, a troublesome manipulation which when overlooked will cause an introduction of an incorrect shutter time value to the exposure control system of the camera. In addition to this, there is some possibility of occurrence of an accidentally incorrect setting of the shutter dial after the necessary manipulation has been made for flash photography.

For a solution of these problems, the prior art has proposed the provision of an additional timing circuit arranged in an automatic exposure control circuit to operate independently of the intrinsic timing circuit cooperative with the shutter dial and constructed to form only one exposure interval of, for example, 1/60 second adapted for use in flash photography. Although the selection of either the additional or the intrinsic timing circuit for cooperation with an electronic switch controlling the period of actuation of the shutter of a camera can be manually or automatically made by means of a circuit-transfer switch, the exposure control circuit of such construction does not permit for the photographer to modify the particular flash exposure time by taking into account the lighting condition of the environment surrounding an object of principal flash photographic interest, or to make flash exposure under ambient or day-light illumination, namely, what is called "day-light-synchro" flash exposures. In order to make "day-light-synchro" flash exposures, therefore, the additional timing circuit must be cut off from the exposure control circuit, and then the day-light exposure range is rendered operative while the shutter dial is being readjusted to select an exposure time from a series of bracketed exposure times ranging, for example, from ¼ second to 1/60 second based on his personal experience. When this manipulation of the shutter dial is overlooked in switching the camera from the day-light exposure range to the flash exposure range, in the case where the preceeding day-light exposure was made with an exposure time outside a possible flash exposure time range, no correct flash exposures can be made, as the additional timing circuit for flash photography works to no purpose.

SUMMARY OF THE INVENTION

Accordingly, the present invention has for the general object to provide an automatic exposure control system for day-light and flash photography which permits for the photographer to make correct flash exposures even when he overlooked the necessary manipulation of the shutter dial of a camera in switching the camera from a day-light exposure range to a flash exposure range.

An object of the present invention is to provide an automatic exposure control apparatus for day-light and flash photography associated with a flash exposure time range bracketing device in order to insure that the formation of a correct flash exposure aperture is effected with automatic selection of one of the bracketed exposure times despite the incorrect setting of the shutter dial of the camera which may be encountered particularly when the day-light exposure range is to be left for the flash exposure range without the necessary manipulation of the shutter dial.

According to one preferred embodiment of the present invention, the flash exposure time range bracketing device comprises a first timing circuit serving as the intrinsic timing circuit of the automatic exposure control apparatus when rendered operative for day-light photography, second and third timing circuits each adapted to form only one exposure time equal to either of the limits of a possible flash exposure time range, and a circuit-transfer switch having three switched positions for selecting the first, second or third timing circuit for operative connection with an electronic switch controlling the period of actuation of the camera shutter when the shutter dial associated with the circuit-transfer switch is set either within, or on the faster side of, or on the slower side of the possible flash exposure time range respectively, whereby the resultant period of actuation of the shutter is equal to either the shutter time preselected on the shutter dial, or the faster limit of, or the slower limit of the flash exposure time range respectively.

Another object of the present invention is to provide a flash exposure time range bracketing device of the character described and simplified in structure as having a common timing capacitor for the first, second and third timing circuits.

Still another object of the present invention is to provide a flash exposure time range bracketing device of the character described and having an electronic switching network arranged to be responsive to one of three outputs of different voltage level produced from a manually switchable operating range selector for causing the exposure control apparatus to be rendered operative in an automatically operating day-light exposure range, or in an automatically operating flash exposure range, or in a manually operating flash exposure range with a particular exposure time of, for example, 1/60 second respectively, whereby the photographer may select any one of these three exposure ranges by taking into account the lighting condition of a given photographic situation.

Other objects and features of the present invention will become apparent from the following detailed description taken in conjunction with the accompanying drawings in which:

BRIEF DESCRIPTION OF THE DRAWINGS

FIG. 2a and 2b together show a circuit diagram, partially in block form, of an automatic exposure control apparatus for controlling the iris of a single lens reflex camera suitable for association with a flash exposure time range bracketing device of the present invention.

DESCRIPTION OF THE PREFERRED EMBODIMENT

Figure 1:
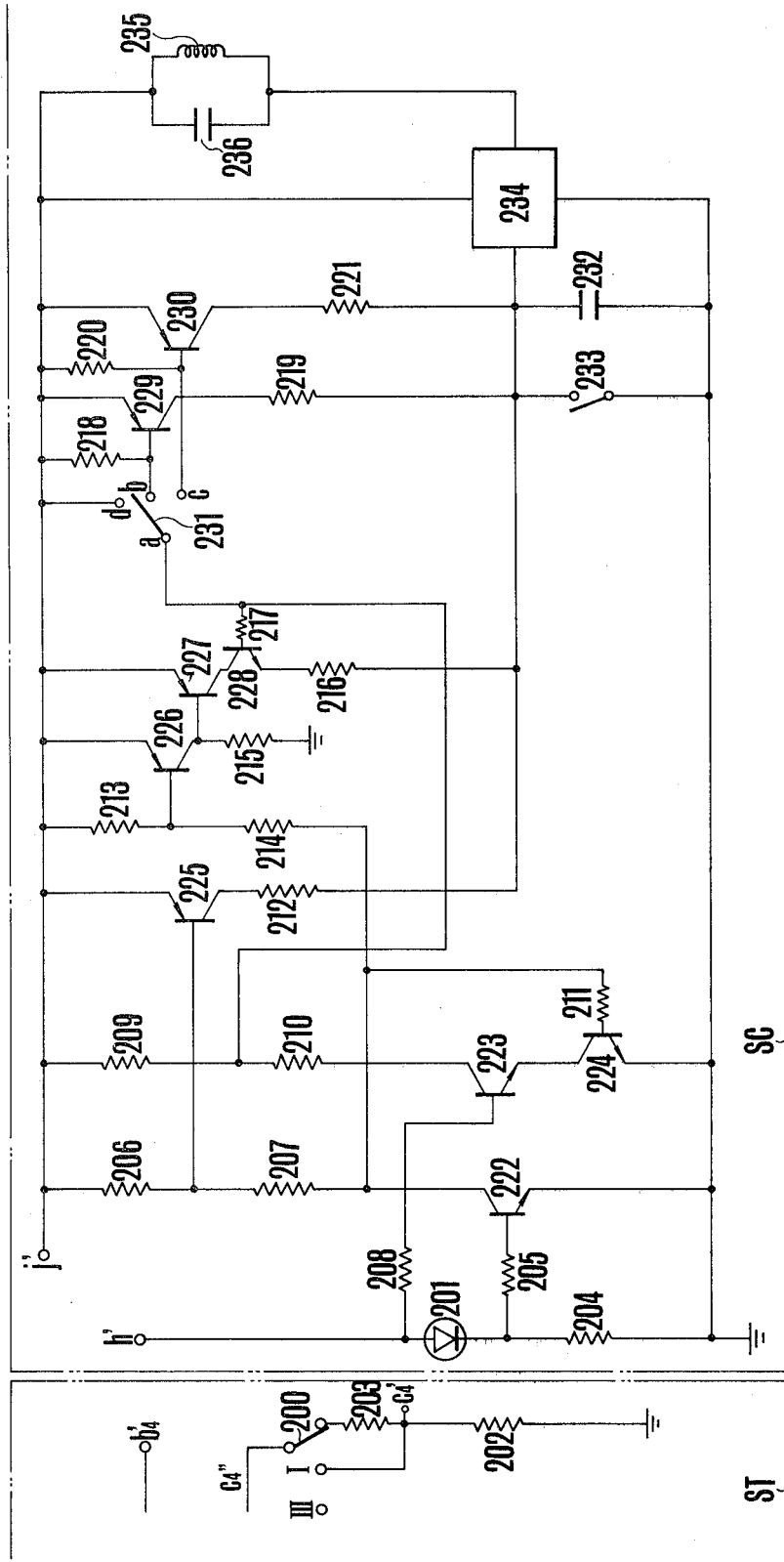
FIG. 1 is a circuit diagram of one embodiment of a flash exposure time range bracketing device according to the present invention.
Figure 3:
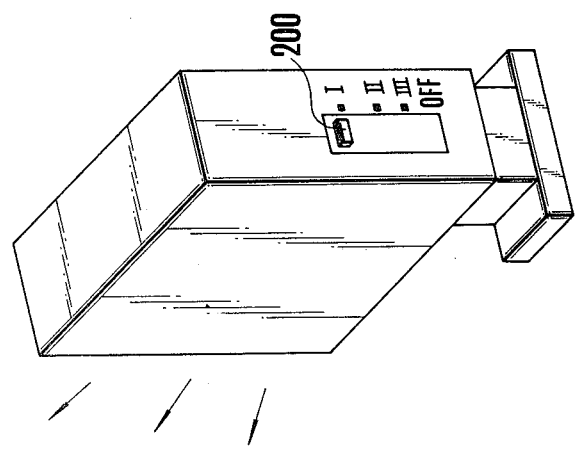
FIG. 3 is a perspective view of a flash unit provided with a manually switchable operating range selector arranged to be rendered cooperative with the flash exposure time range bracketing device of FIG. 1 when the flash unit is attached to the camera of FIGS. 2a and b.
Figure 4:
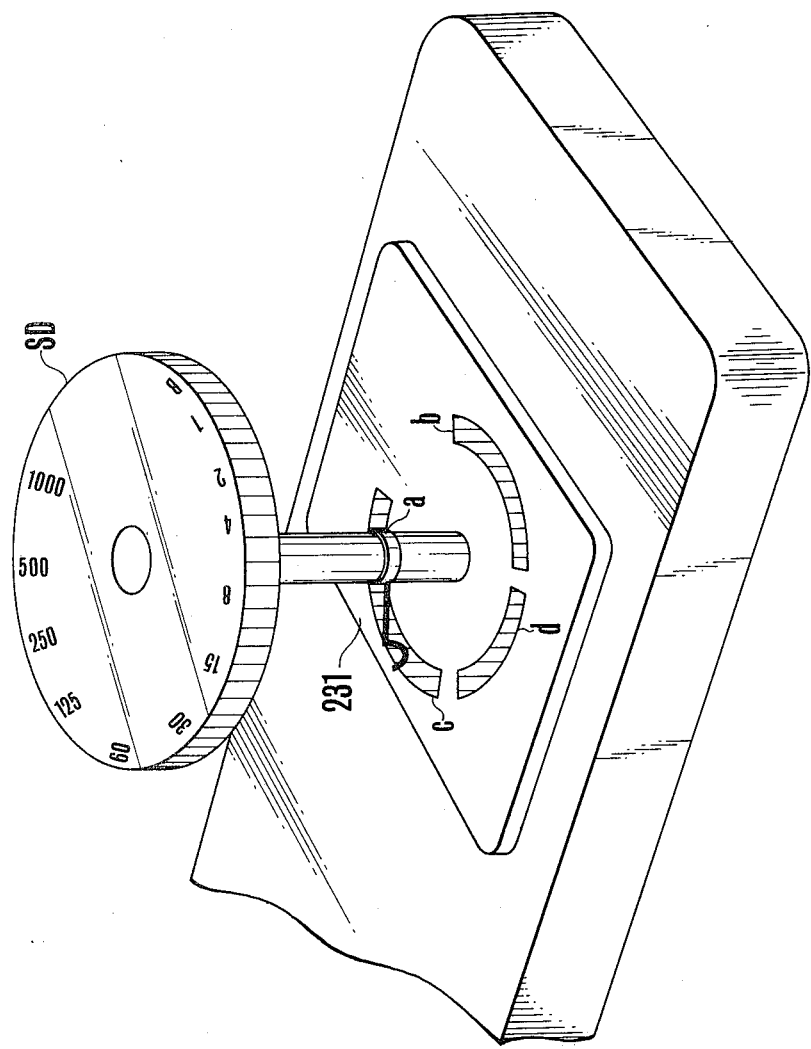
FIG. 4 is a perspective view showing an example of arrangement of a circuit-transfer switch of the device of the present invention in a shutter dial structure.

Referring to FIGS. 1, 3 and 4, there is shown one embodiment of a flash exposure time range bracketing device according to the present invention as applied to an automatic exposure control apparatus for controlling the iris of a single lens reflex camera in accordance with a computed exposure value and a preselected shutter time on a shutter dial. As shown in FIG. 1, the flash exposure time range bracketing device includes a first timing variable resistor 216, a second timing fixed resistor 219 and a third timing fixed resistor 221, all of which are connected at their one ends to the positive pole of a common timing capacitor 232 to constitute first, second and third timing circuits respectively. The first timing circuit provides a range of exposure times wider than a possible flash exposure time range of, for example, from ¼ second to 1/60 second, as the timing variable resistor 216 operates with the shutter dial of the camera. The second timing circuit provides only one exposure time equal to the faster limit, in this example, 1/60 second, of the possible flash exposure time range, and the third timing circuit provides only one exposure time equal to the slower limit thereof, in this example, ¼ second. In order to select either the first, or the second, or the third timing circuit for operative connection with an electronic switch 234 such as a Schmitt type trigger circuit controlling the period of actuation of the camera shutter, in this instance, the period of energization of a solenoid 235 of an electromagnet associated with a shutter control mechanism not shown, there is provided a circuit-transfer mechanical switch 231 having a single pole 231a and having three fixed terminals or positions 231b, 231c, and 231d in combination with three transistorized switch members. The first switch member comprises a first transistor 227 having an emitter electrode connected to the positive bus and having a base electrode connected to an output of an operating range selecting circuit network to be described in detail later, and a second transistor 228 having a collector electrode connected to the collector electrode of the first transistor 227, having an emitter electrode connected to the timing variable resistor 216 and having a base electrode connected through a resistor 217 to the pole 231a of the circuit-transfer switch 231 and therefrom further connected to the positive bus when the pole 231a is in the position 231b. The second switch member comprises a single transistor 229 having an emitter electrode connected to the positive bus, having a collector electrode connected to the timing resistor 219 and having a base electrode connected through a resistor 218 to the positive bus and also connected to a fixed terminal 231b of the mechanical switch 231. The third swich member comprises a single transistor 230 having an emitter electrode connected to the positive bus, having a collector electrode connected to the timing resistor 221 and having a base electrode connected through a resistor 220 to the positive bus and also connected to the terminal 231c of the circuit-transfer mechanical switch 231. A practical example of construction and arrangement of the switch 231 in a shutter time setting mechanism having the shutter dial is shown in FIG. 4, in which three arcuate conductor strips designated by characters "b", "c" and "d" are arranged on an electrically insulated substrate in concentric relation to an axis of rotation of the shutter dial SD to serve as the fixed terminals 231b, 231c and 231d respectively.

The operating range selecting circuit network has a manually switchable control knob 200 provided on the housing of a flash unit as shown in FIG. 3. The control knob 200 has a plurality of switched positions including a position designated by I in which a fourth timing circuit containing a resistor 212 and the capacitor 232 is operatively connected to the electronic switch 234, while the first, second and third timing circuits are taken out of operative connection therewith, a position designated by II in which one of the first, second and third timing circuits is cooperative with the electronic switch 234, depending upon which position the circuit-transfer switch 231 is set in, and a position designated by III in which only the first timing circuit is operative to provide the entire range of exposure times available on the shutter dial SD. The fourth timing circuit provides only one exposure time, for example, 1/60 or 1/125 second adapted for use in flash photography only. The central pole of the control knob 200 is connected to an output terminal $C_4''$ of a switching circuit $A_{17}$ (see FIG. 5) at which terminal $C_4''$ an output signal appears when the voltage of a store capacitor $C_7$ has reached a critical voltage level for discharge of a flash tube. The output signal or charge-terminating signal is transmitted either directly or through a resistor 203 to an interconnecting terminal $C_4'$ when the control knob 200 is set in a position I or II. Connected in series to the resistor 203 is a resistor 202 to form a voltage divider. When the flash unit is attached to the camera, the charge-terminating signal is transmitted through interconnecting terminals $C_4$, and h of FIG. 2 to an interconnecting terminal h' of FIG. 1. The magnitude of the charge-terminating signal is such that when the control knob 200 is set in the "I" position to apply the signal through a light-emitting diode 201 and a resistor 205 to the base electrode of a transistor 222 as well as through a resistor 208 to the base electrode of a transistor 223, the transistor 222 is rendered conducting, while the transistor 223 remains in the non-conducting state, and that when the control knob 200 is set in the "II" position, the transistor 222 is rendered non-conducting, while the transistor 223 is rendered conducting. The collector electrode of the transistor 222 is connected to the positive bus both through series-connected resistors 206 and 207 and through series-connected resistors 213 and 214, and its emitter electrode is connected to the negative bus. The collector electrode of the transistor 223 is connected through series-connected resistors 209 and 210 to the positive bus, and its emitter electrode is connected to the negative bus through a transistor 224 having a collector electrode connected to the emitter electrode of transistor 223 and having a base electrode connected through a resistor 211 to the collector electrode of the transistor 222, so that when the transistor 222 is in the conducting state, the transistor 224 is in the non-conducting state, and the vice versa. Connected to a point on the series-connection between the resistors 206 and 207 is the base electrode of a transistor 225 having an emitter electrode connected to the positive bus and having a collector electrode connected to the fourth timing resistor 212 so that the conduction of the transistor 222 causes conduction of the transistor 225 which renders the fourth timing circuit operative with the electronic switch 234. Connected to a point on the series-connection between the resistors 213 and 214 is the base electrode of a transistor 226 having an emitter electrode connected to the positive bus and having a collector electrode connected through a resistor 215 to the negative bus as well as to the base electrode of the transistor 227 of the first transistorized switch member, so that the conduction of the transistor 222 causes conduction of transistor 226 which in turn causes non-conduction of transistor 227, thereby the first timing circuit is taken out of operative connection with the electronic switch 234. Connected across the timing capacitor 232 is a count switch 233 which is opened in synchronism with the initiation of an exposure.

Figure 2A:
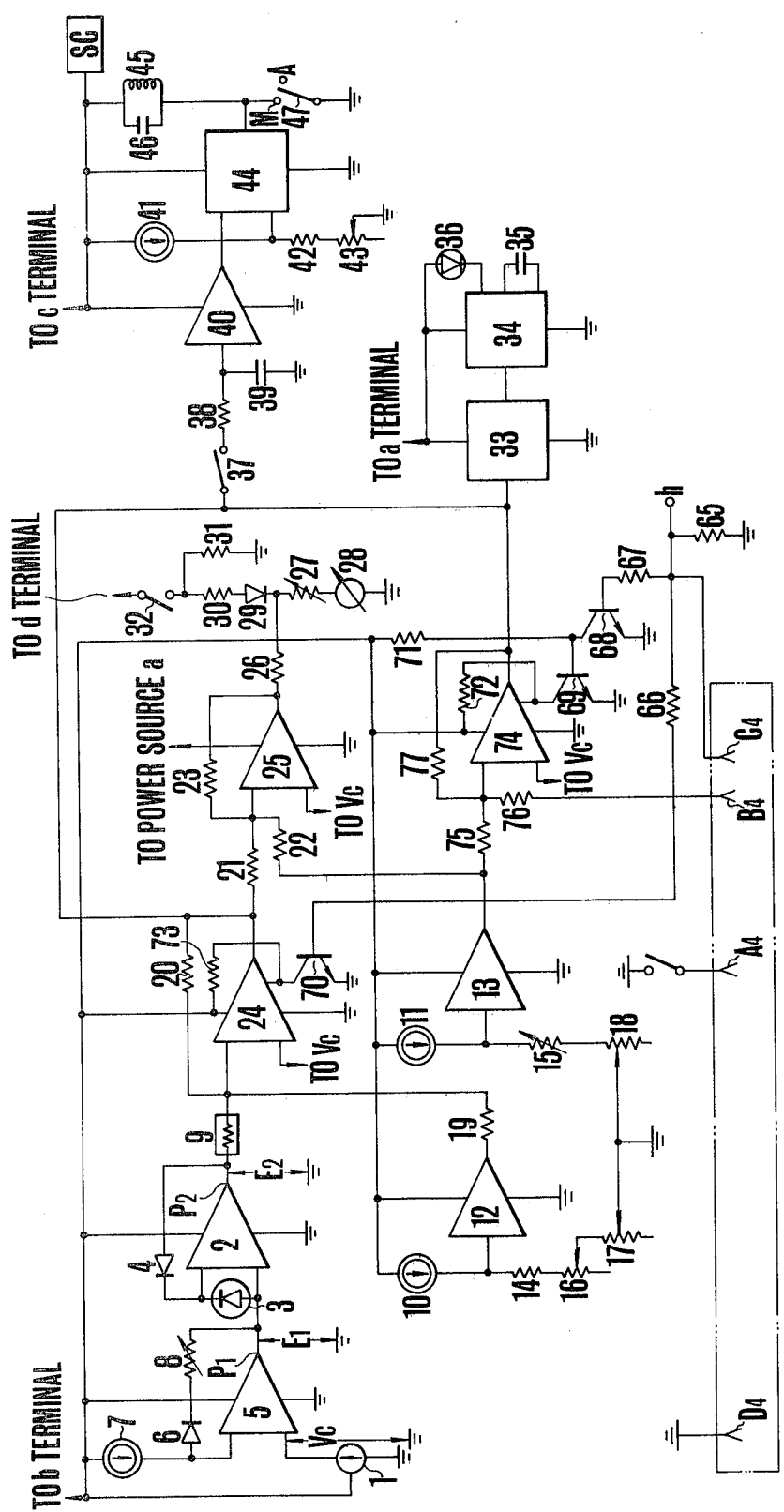

FIGS. 2a and b shows a specific example of an automatic exposure control circuit for controlling the size of an effective exposure aperture of a camera in accordance either with a computed exposure value and a preselected shutter time on the shutter dial, or with a shutter time preselected on a self-timer, or with a guide number of the used flash unit. The exposure control circuit essentially comprises a sensor circuit, an exposure control parameter setting circuit, a guide number processing circuit, a computer circuit, a switching circuit selectively responsive to the computer circuit and the guide number processing circuit for energizing and deenergizing a solenoid of an electromagnet associated with a diaphragm control mechanism, and a shutter control circuit associated with the flash exposure time range bracketing circuit of the present invention.

The sensor circuit comprises a photosensitive element 3 such as a silicon blue cell connected between two input terminals of an operational amplifier 2, and a feed back diode 4 connected between the input and output of amplifier 2. A voltage $E_2$ appearing at the output terminal of the sensor circuit is directly proportional to the logarithm of the illuminance of a scene being photographed, so long as a high standard of temperature compensation is effected. A temperature compensating circuit comprises an operational amplifier 5 having a pair of input terminals one of which is connected through a reference voltage source 1 to ground, and the other of which is connected to the positive bus or "b" terminal through a constant current source 7 constructed with emitter-follower connection of transistors, a feedback diode 6 and a feedback variable resistor 8 connected in series with feedback diode 6 and between the second-named input terminal and the output terminal of amplifier 5.

The exposure control parameter setting circuit comprises a constant current source 10, a voltage ajustment resistor 14 connected in series with constant current source 10, a pair of variable resistors 16 and 17 connected in series with each other and to resistor 14 and, an operational amplifier 12 having an input terminal connected to a point on the connection between constant current source 10 and resistor 14 and having an output terminal connected through a resistor 19 to an input terminal of the computer circuit. A difference($Sv - Tv$) between the preselected shutter speed ($Tv$) and the used film speed ($Sv$) and a maximum aperture correction value ($Avc$) are introduced to the variable resistors 16 and 17 respectively.

The computer circuit comprises an operational amplifier 24 having a pair of input terminals, one of which is connected to the reference voltage source 1, and the other of which is connected both to the output terminal of the sensor circuit through a temperature compensating resistor 9 having positive temperature characteristics and to the output terminal of the exposure parameter setting circuit through a resistor 19, and a feedback resistor 20 connected between the second-named input terminal and the output terminal of amplifier 24. The output of the computer circuit is proportional to a difference between the sizes of an effective exposure aperture and a maximum aperture available in the lens aperture mechanism of the camera. In order to display the value of the effective exposure aperture derived by the computer circuit, there is provided an indicator circuit comprising an operational amplifier 25 having a pair of input terminals one of which is connected to the reference voltage source 1 and the other of which is connected through a resistor 21 to the output terminal of the computer circuit and through a resistor 22 to the output terminal of a maximum aperture or F-number setting circuit, and a feedback resistor 23 connected between the second-named input terminal and the output terminal of amplifier 25. The F-number setting circuit comprises an operational amplifier 13 having an input connected to a point on the connection between a constant current source 11 and a voltage ajustment variable resistor 15, and a variable resistor 18 connected in series with resistor 15 and into which the maximum possible aperture value (AVO) is introduced. The output terminal of amplifier 25 is connected through a fixed resistor 26 and a variable resistor 27 to an exposure meter 28. The meter 28 serves as an indicator of a battery testing circuit when a switch 32 is closed. The battery testing circuit comprises a resistor 30 connected at one end thereof to the positive terminal of a battery 80 through the switch 32, the opposite end of which is connected to a point on the connection between resistors 26 and 27 through a diode 29 serving as an electrical separator between the exposure value indicating circuit and the battery testing circuit, and a resistor 31 connected between ground and a point on the connection between switch 32 and resistor 30 and having a resistance value such that a current equal to the total current flowing through the exposure control circuit is allowed to flow through the resistor 31.

The guide number processing circuit comprises an operational amplifier 74 with a feedback resistor 77 connected between an input terminal and the output terminal of amplifier 74 and with the input terminal connected both to the output terminal of the maximum aperture value setting circuit through a resistor 75 and to the output terminal of a guide number setting variable resistor $VR_5$ (see FIG. 5) provided in the flash unit through a resistor 76 and interconnecting terminals $B_4$ and $B_4'$. In order to select the guide number processing circuit for operative connection with the switching circuit in automatic response to an attainment of the voltage of the store capacitor $C_7$ to the critical voltage level for discharge of the flash tube $L_3$, there is provided a selector circuit comprising a first transistor 70 having a base electrode connected through a resistor 66 to the interconnecting terminal $C_4$, having an emitter electrode grounded and having a collector electrode connected to amplifier 24 and to a resistor 73 connected across amplifier 24, a second transistor 67 having a base electrode connected through resistor 67 to the interconnection terminal $C_4$, having an emitter electrode grounded and having a collector electrode connected to the "b" terminal, and a third transistor 69 having a base electrode connected to the collector electrode of second transistor 68, having a grounded emitter electrode and having a collector electrode connected both to amplifier 74 and to a resistor 72 connected across amplifier 74. A warning circuit containing parts 33 through 36 is provided for warning the photographer of whether or not the effective exposure aperture derived either from the computer circuit or from the guide number processing circuit is available in the lens aperture mechanism of the camera as the level of brightness of a given photographic situation is lower than the lower limit of a photographable light value range. 33 is a detector having an input terminal connected both of the output terminals of operational amplifiers 24 and 74 and having an output terminal connected to an input terminal of an oscillator 34 provided with a capacitor 35 and a light-emitting diode 36. When the effective aperture derived is larger than the maximum possible aperture, the output of the detector 33 is inverted, causing diode 36 to flicker.

The switching circuit comprises a comparator 44 having a pair of input terminals, one of which is selectively receptive of the outputs of the computer circuit and guide number processing circuit through an operational amplifier 40 of high input impedance after the selected output has once been stored on a memory capacitor 39. The memory capacitor 39 is connected to both of the output terminals of amplifiers 24 and 74 through a resistor 38 and a switch 37 connected in series to resistor 38, the switch 37 being arranged to be opened when a reflux mirror not shown is moved its viewing position to its non-viewing position, the other of which is connected to a point on the connection between a constant current source 41 and an adjustment resistor 42. Connected in series to resistor 42 is a variable resistor 43 into which ever-varying sizes of the actual exposure aperture is introduced as the lens aperture mechanism is moved from the maximum to the minimum aperture opening position. When the two inputs of comparator 44 become coincident with each other, a solenoid 45 connected to the output terminal of comparator 44 is deenergized, thereby the moving lens aperture mechanism is arrested to effect the automatic formation of a correct exposure aperture therein. The solenoid 45 is provided with a capacitor 46 connected thereacross, the parts 45 and 46 constituting a resonance circuit serving for assistance towards the sharp-cut of residual magnetic flux from the electromagnet. A change-over switch 47 is provided for selecting one of two diaphragm control modes, namely, an automatically operating diaphragm control mode when set in the "A" position, and a manually operating diaphragm control mode when set in the "M" position.

The automatic exposure control circuit is further provided with an electrical drive power supply control circuit for controlling electrical drive power supply from a battery 80 to the various circuit sections of the exposure control circuit in timed relation to each other. When a shutter release button not shown is depressed to a first stroke to close a switch 101, a base current is caused to flow from the base electrode of a transistor 81 through a resistor 86 and a diode 95 to the negative bus and simultaneously to flow from the base electrode of a transistor 83 through a resistor 90 and a diode 96 to the negative bus, thereby an electrical drive power is applied to the sensor circuit and to the exposure value indicator circuit through terminals "a" and "b" connected to the collector electrodes of transistors 81 and 83 respectively. Upon further depression of the shutter button to a second stroke, a switch 102 is closed to cause conduction of a transistor 82 through series-connected resistors 87 and 88 and a diode 98 which in turn causes non-conduction of the transistor 81 and also causes operation of a power supply self-retaining circuit containing transistors 84 and 85, resistors 91 through 94 and a diode 99. After that, the photographer may remove his finger from the shutter button without causing the power supply to be cut-off from the "b" terminal. Connected across resistor 94 is a noise preventing capacitor 100. A switch 103 is a safety switch which is opened when a rear shutter curtain has run down to the aperture blocking position and which is closed when the shutter is cocked. When a switch 112 is closed, a self-timer circuit containing a resistor 111 and a capacitor 110 connected in series with each other is rendered operative, while when the switch 112 is opened, a delay circuit comprising a timing circuit containing the resistor 111 and a capacitor 117, and a detector 118 is rendered operative. When the self-timer is rendered operative, an indicator containing a detector 113, a light-emitting diode 114, an energy storing capacitor 115 and a resistor 116 produces self-timer-acted-on information for the photographer in a certain period of time before the actuation of the shutter. This indicator also serves to produce shutter-acted-on information when the normal exposure operation is carried out. When the self-timer is not used, in other words, when the shutter control circuit SC is to be rendered operative to establish an exposure interval, the delay circuit produces an output after a predetermined period of time dependent upon the time constant of the timing circuit 111 and 117 from the time at which the self-retaining circuit is rendered operative. The output of the delay circuit is applied to the base electrode of a transistor 119 through a resistor 123 and to the base electrode of a transistor 121 through a resistor 127, thereby the transistors 119 and 121 and a transistor 120 having a base electrode connected through a resistor 124 to the collector electrode of the transistor 119 are rendered conducting to supply drive power through the "c" terminal both to the switching circuit controlling the diaphragm of the camera and to the shutter control circuit SC, and at the same time to energize a solenoid 130 of an electromagnet associated with a camera release mechanism. A drive power for the solenoid 130 is supplied from a capacitor 131. The charging speed of the capacitor 131 depends upon the resistance value of a resistor 129 connected in series with the capacitor 131. Connected in parallel with the solenoid 130 is a diode 132 for preventing occurrence of reverse pulses to the solenoid 130. A noise preventing capacitor 128 is connected between the positive bus and the base electrode of transistor 119. Reference characters $A_4$, $B_4$, $C_4$ and $D_4$ in a dashed line block designate interconnection terminals adapted for connection with respective interconnection terminals $a_4'$, $b_4'$, $c_4'$ and $d_4'$ provided in the flash unit.

Figure 5:
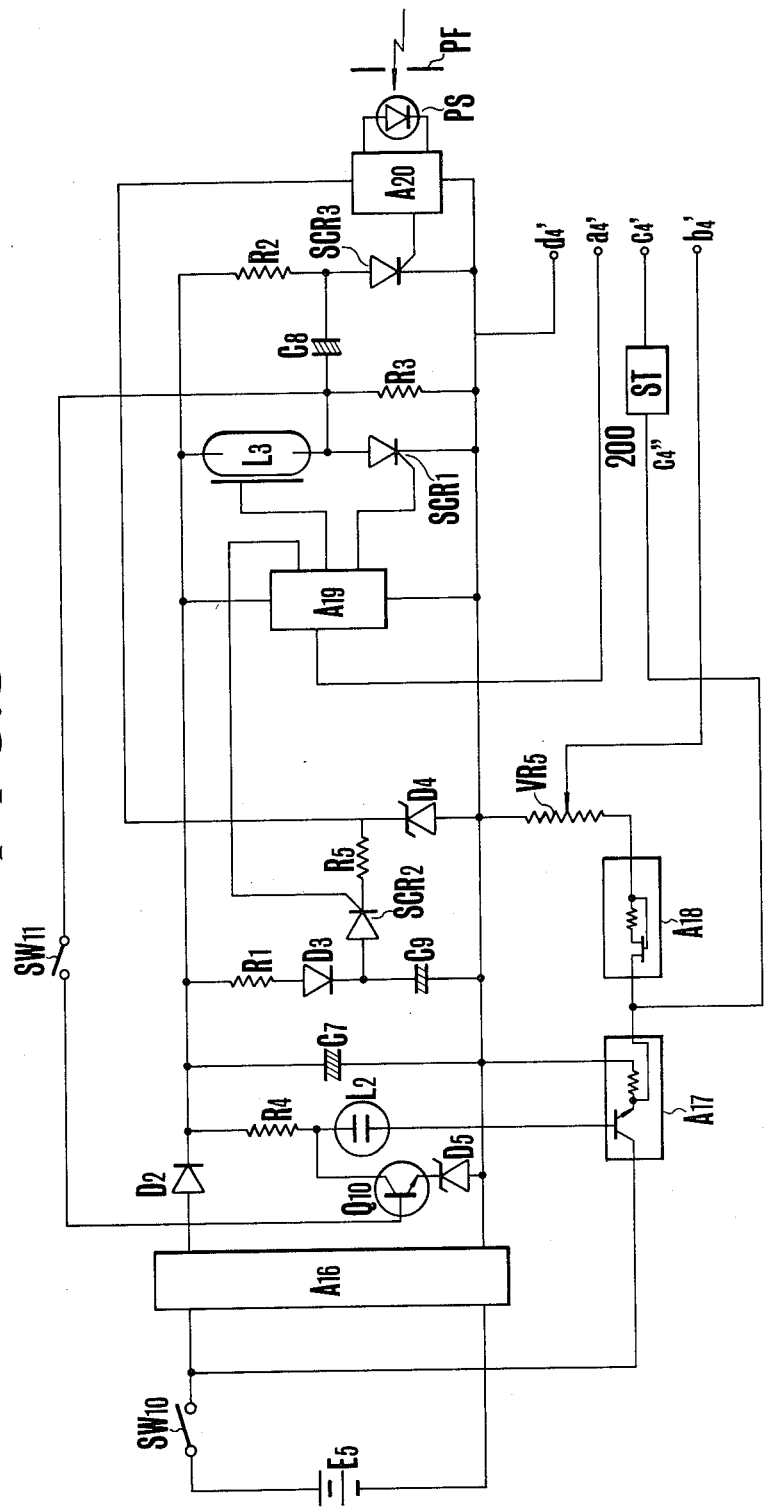
FIG. 5 is a circuit diagram, partially in block form, of the flash unit of FIG. 3.

FIG. 5 shows an example of a flash control circuit suitable for use with the exposure control circuit of FIGS. 1 and 2. The flash control circuit includes a battery $E_5$, a converter $A_{16}$ connected through a power switch $SW_{10}$ to battery $E_5$, a main storage capacitor $C_7$ connected between the two outputs terminals of the converter $A_{16}$ through a rectifier diode $D_2$, a discharge tube $L_3$ with the anode thereof connected to the positive pole of capacitor $C_7$ and with the cathode thereof connected through a first thyrister $SCR_1$ to the negative pole of capacitor $C_7$, and a trigger circuit $A_{19}$. When the interconnection terminals $a_4'$ and $d_4'$ are short-circuited in a manner known in the art, the trigger circuit $A_{19}$ is triggered to produce an output which is applied to a trigger electrode of discharge tube $L_3$, to the gating control input terminal of first thyrister $SCR_1$ and to the gating control input terminal of a second thyrister $SCR_2$, thereby capacitor $C_7$ is discharged through discharge tube $L_3$ and first thyrister $SCR_1$ to produce flash light. Light coming from an object being photographed with flash illumination is received through a diaphragm PF by a photosensitive element PS such as a photodiode. The output of element PS is integrated by an operational amplifier integrator $A_{20}$. After a timed interval from the initiation of energization of discharge tube $L_3$, integrator $A_{20}$ produces an output which is applied to the gating control input of a third thyrister $SCR_3$, thereby a reverse voltage is applied to the first thyrister $SCR_1$ through a resistor $R_3$ from a commutation capacitor $C_8$ to terminate the duration of energization of discharge tube $L_3$. A constant voltage power supply source for the integrator $A_{20}$ comprises a resistor $R_1$, a diode $D_3$ connected in series with resistor $R_1$, a capacitor $C_9$ connected in series with diode $D_3$, and a Zener diode $D_4$ connected across capacitor $C_9$ through second thyrister $SCR_2$ and a resistor $R_5$ connected in series with each other. When the main storage capacitor $C_7$ and the commutation capacitor $C_8$ are charged to respective predetermined voltage levels, a neon tube $L_2$ breaks down causing a transistorized switching circuit $A_{17}$ to produce a charge-terminating signal which is then applied through switch 200 to the interconnection terminal $c_4'$. Connected between the negative bus and the output terminal of circuit $A_{17}$ is a constant current circuit $A_{18}$ and a variable resistor $VR_5$ connected in series with each other, so that when circuit $A_{17}$ is turned on, a constant current is allowed to flow through variable resistor $VR_5$ which is adjusted in accordance with the guide number of the flash unit, or with a desired flash exposure aperture.

The operation of the automatic exposure control circuit of FIGS. 1, 2 and 5 is as follows. For making an exposure in the automatic day-light exposure range, the shutter dial SD of FIG. 4 is turned to place a desired shutter time in registry with an index not shown, thereby the variable resistor 216 of FIG. 1 and the variable resistor 16 of FIG. 2 are adjusted in accordance with the preselected shutter time. Next, the particular aperture correction value (AVC) is introduced to resistor 17 of FIG. 2, and then the open F-number (AVO) is introduced to resistor 18 of FIG. 2. After that, the camera is aligned with an object intended to be photographed, and then the shutter release button is depressed to the first stroke to close switch 101 of FIG. 2, thereby the sensor and indicator circuits are rendered operative. The voltage appearing at the output terminal of amplifier 2 is proportional to the logarithm of an object brightness level as sensed by photosensitive element 3. Responsive to the outputs from amplifiers 2 and 12, operational amplifier 24 produces an output with a magnitude representative of a difference between an effective exposure aperture and the maximum possible exposure aperture and which output is transmitted through switch 37 to memory capacitor 39 and then stored thereon. Responsive to the outputs from amplifiers 13 and 24, operational amplifier 25 produces an output with a magnitude representative of the effective exposure aperture which can be read by the meter 28 of FIG. 2. Next, the further depression of the shutter button to the second stroke causes closure of switch 102 of FIG. 2, which in turn causes conduction of transistor 82 of FIG. 2 but non-conduction of transistor 81, thereby amplifier 25 is supplied with no more drive power from battery 80 and the supply of current is cut off from meter 28. At the same time, transistors 84 and 85 are turned on to maintain transistor 83 in the conducting state. After a predetermined time interval dependent upon the time constant of resistor 111 and capacitor 117 from the conduction of transistor 84, the detector 118 is inverted to turn on transistors 119, 120 and 121, thereby the switching circuit containing operational amplifier 40 and comparator 44 and the shutter control circuit SC are rendered operative, and at the same time, the solenoid 130 is energized to release a mirror drive mechanism not shown from its latching member not shown. As the reflex mirror is moved from the viewing position to the non-viewing position, switch 37 is opened to apply a voltage of memory capacitor 39 to one of the input terminal of comparator 44, while the other input terminal of comparator 44 is supplied with ever-varying voltages proportional to ever-varying sizes of actual aperture opening in the lens aperture mechanism which is moving from the maximum aperture opening position to the minimum aperture opening position. When the coincidence is effected between the input magnitudes, comparator 44 produces no more output to deenergize the solenoid 45, thereby the moveing lens aperture mechanism is arrested in a particular aperture opening position, in which a correct exposure aperture is formed in conformance with the exposure value derived from the computer circuit and the preselected shutter time. As the mirror is further moved to the non-viewing position, the front shutter curtain begins to run down to the fully open position, thereby the exposure is initiated with closure of count switch 233 of FIG. 1. As no signal is transmitted to the interconnection terminal $C_4'$, transistors 222 through 226, 229 and 230 are in the non-conducting state, while transistors 227 and 228 are in the conducting state, whereby the first timing circuit having resistor 216 adjusted in accordance with the preselected shutter time is cooperative with the electronic switch 234. At the termination of duration of the shutter time preselected on the shutter dial SD from the initiation of the exposure, the electronic switch 234 produces an output causing the rear shutter curtain to run down to the blocking position, thereby the day-light exposure is terminated.

For making an exposure in flash mode, the flash unit of FIG. 3 is attached to the camera to connect terminals $A_4$, $B_4$, $C_4$ and $D_4$ of the exosure control circuit with terminals $a_4'$, $b_4'$, $c_4'$ and $d_4'$ of the flash control circuit of FIG. 5 respectively. Next, the power switch $SW_{10}$ of FIG. 5 is closed to charge the main capacitor $C_7$ and commutation capacitor $C_8$ from battery $E_5$ with a voltage increased by converter $A_{16}$. When the voltages of capacitors $C_7$ and $C_8$ have reached their respective critical levels, neon tube $L_2$ is lighted on, and then the switching circuit $A_{17}$ is turned on to produce a charge-terminating signal output which is transmitted through switch 200 to terminal $c_4'$ and therefrom to terminal $C_4$ of FIG. 2. On the other hand, a constant current is allowed to flow through variable resistor $VR_5$ which was previously adjusted in accordance with the guide number of the flash unit, thereby an output appearing at the slider of variable resistor $VR_5$ is transmitted through terminals $b_4'$ and $B_4$ to the input terminal of the guide number processing circuit. Upon advent of the charge-terminating signal on terminal $C_4$, transistor 70 is turned on to render the computer circuit inoperative, and instead transistor 68 is turned off to render operative the guide number processing circuit. Responsive to the output ($|Av|$) from variable resistor $VR_5$ and the output (AVO) from amplifier 13, the guide number processing circuit produces an output with a magnitude proportional to a difference between an effective flash exposure aperture and the maximum possible exposure aperture. This output after once stored on capacitor 39 is utilized in controlling operation of the lens aperture mechanism in a manner similar to that shown in connection with the day-light exposure operation.

Now assuming that switch 200 is set in the "I" position, the charge-terminating signal voltage is applied through terminals $c_4' - C_4 - h - h'$ to the light-emitting diode 201 without causing any decrease thereof so that diode 201 is lighted on to teach the photographer that the flash control circuit is ready for flash exposure operation. In this state, transistor 222 is turned on, while transistor 224 is turned off. Therefore, transistor 223 is off, transistors 225 and 226 are on, and transistors 227 through 230 are off, so that the fourth timing circuit is cooperative with electronic switch 234. As the count switch 233 is opened in synchronism with the depression of the shutter release button, electronic switch 234 is actuated after 1/60 second or 1/125 second from the opening of count switch 233, independently of the setting of the shutter dial SD.

Now assuming that switch 200 is set in the "II" position, the voltage of the charge-terminating signal output is divided by the voltage divider 202 and 203, and then a fraction of the signal voltage is applied to the base electrodes of transistors 222 and 223, thereby transistor 223 is rendered conducting, but transistor 222 remains in the non-conducting state, as a voltage drop is effected across the charge termination indicator light-emitting diode 201. In this state, transistor 224 is on, while transistors 225 and 226 are off. Further assuming that the shutter dial SD is set in a position providing a shutter time faster than 1/60 second, the circuit-transfer switch 231 is automatically set in "b" position in which the second timing circuit 219 and 232 is cooperative with electronic switch 234, as transistor 229 is turned on by a voltage drop across resistor 218, but transistor 228 remains in "off" state because of the application of a relatively low potential to the base electrode thereof through a voltage divider of resistors 210 and 218. In this arrangement, the electronic switch 234 is actuated after 1/60 second from the opening of count switch 233 despite of the fact that the shutter time preselected on the shutter dial SD is faster than 1/60 second. Alternately assuming that the shutter dial SD is set in a position providing a shutter time within a range of from ¼ second to 1/60 second, the circuit transfer switch 231 is automatically set in the "d" position wherein the first timing circuit 216 and 232 is cooperative with electronic switch 234, as transistor 228 is turned on by application of a relatively high potential to the base electrode thereof. In this arrangement the electronic switch 234 is actuated after the shutter time preselected on the shutter dial SC from the opening of count switch 233. Further, alternately assuming that the shutter dial SC is set in a position providing a shutter time lower than ¼ second, the circuit-transfer switch 231 is automatically set in the "c" position, in which the third timing circuit 221 and 232 is cooperative with electronic switch 234, as transistor 230 is turned on and transistor 228 is turned off. In this arrangement, electronic switch 234 is actuated after ¼ second from the opening of count switch 233 despite of the fact that the shutter time preselected on the shutter dial is lower than ¼ second. It will be appreciated from the above that so long as the control knob 200 of the flash unit of FIG. 3 is set in the "II" position, it is possible, should the necessary manipulation for flash photography be overlooked, to make a correct flash exposure with a shutter time within a possible flash exposure time range of in this instance, from ¼ second to 1/60 second and further to make day-light-synchro flash exposures with intentional selection of a shutter time from the range of ¼ second to 1/60 second.

On the other hand, when the control knob 200 is set in the "III" position, the charge terminating signal is not transmitted to the terminals $C_4$ and $h'$ on the camera side, so that both of transistors 222 and 223 remain in "off" positions. Therefore, transistors 224, 225, 226, 229 and 230 are in "off" positions regardless of the position of circuit-transfer switch 231, but only transistors 227 and 228 are turned on to permit the flash exposure time range bracketing device of FIG. 1 to operate in the entire range of shutter times available on the shutter dial SD.

It will be seen from the foregoing description that the preferred embodiment of the flash exposure time range bracketing device of the present invention accomplishes the above mentioned objects of the invention. The present invention has been described in connection with an example of application to a particular type of exposure control apparatus, but may be applicable to various types of exposure control apparatus for day-light and flash photography without causing unduly large increase in the complexity of structure thereof, thereby giving an advantage of simplifying operation of the camera employing the same in making flash exposures between day-light exposures, or in making day-light-synchro flash exposures with intentional selection of a shutter time from a series of bracketed exposure times.

What is claimed is:
1. In an automatic exposure control apparatus for a camera of the type provided with a day-light exposure range and with a flash exposure range;
   a. shutter time setting means arranged to provide a range of shutter times wider than a possible flash exposure time range,
   b. first timing means cooperative with said shutter time setting means for generating voltage capable of attaining a critical level in a time interval equal to the shutter time preselected on said shutter time setting means, c. second timing means for generating voltage capable of attaining said critical level in a time interval equal to the faster limit of said flash exposure time range,
d. third timing means for generating voltage capable of attaining said critical level in a time interval equal to the slower limit of said flash exposure time range,
e. shutter control means selectively responsive to the outputs of said first, said second and said third timing means for controlling the period of actuation of the shutter of said camera,
f. selecting means responsive to the setting of said shutter time setting means to a shutter time either within, or on the faster side of, or on the slower side of said flash exposure time range for selecting either said first, or said second, or said third timing means respectively for operative connection with said shutter control means, whereby a correct flash exposure is made with automatic selection of a shutter time within said flash exposure time range regardless of the selected position of said shutter time setting means.

2. An automatic exposure control apparatus according to claim 1, wherein said first timing means includes a variable resistor as the timing resistor.

3. An automatic exposure control apparatus according to claim 1, wherein said second and said third timing means each include a fixed resistor having a particular resistance value as the timing resistor.

4. In an automatic exposure control apparatus for a camera of the type provided with a day-light exposure range and with a flash exposure range;
a. shutter time setting means arranged to provide a range of shutter times wider than a possible flash exposure time range,
b. shutter time regulating circuit means having three timing resistors, the first timing resistor being a variable resistor adjustable in automatic response to the setting of said shutter time setting means, and the second and third timing resistors being fixed resistors having different resistance values from each other, and having a common timing capacitor connected to all of said first, said second and said third timing resistors to constitute respectively a first timing circuit for generating voltage capable of attaining a critical level in a time interval equal to the shutter time preselected on said shutter time setting means, a second timing circuit for generating voltage capable of attaining said critical level in a time interval equal to the faster limit of said flash exposure time range, and a third timing circuit for generating voltage capable of attaining said critical level in a time interval equal to the slower limit of said flash exposure time range,
c. shutter control circuit means selctively responsive to the outputs of said three timing circuits for controlling the period of actuation of the shutter of said camera,
d. three switching elements connected to said respective timing resistors upon selective connection thereof for establishing a single charging circuit for said common timing capacitor along with the one of said three timing resistors which is connected to the acted-on switching element at a time,
e. selectively actuating means responsive to the setting of said shutter time setting means to a shutter time either within, or on the faster side of, or on the slower side of said flash exposure time range for selectively actuating said three switching elements for conduction, whereby said first, or said second or said third timing circuit is rendered cooperative with said shutter control circuit means respectively.

5. An automatic exposure control apparatus according to claim 4, wherein said selectively actuating means is arranged to operate with a charge terminating signal supplied from a flash control circuit for selectively actuating said switching elements.

6. A flash photographic exposure control system comprising,
A. a flash unit having,
a. store means chargeable to a predetermined voltage level for storing an amount of electrical energy convertible to flash light when discharged through a flash tube,
b. a detector circuit responsive to the attainments of the voltage of said store means to said predetermined level for producing a charge-terminating signal output of a predetermined level,
c. changeover means having a plurality of positions including a position in which a flash exposure range is operative with a particular exposure time adapted for use in flash photography only, and a position in which a flash exposure range is operative with an automatic selection of a shutter time from a series of bracketed exposure times, and
d. level modifying means connected to the output of said detector circuit upon selection of either of said two position by said change-over means for modifying said level of said signal output into either a first or a second level different from each other, and
B. a camera body having:
a. shutter time setting means arranged to provide a range of shutter times wider than a possible flash exposure time range,
b. first timing means for generating voltage capable of attaining a critical level in a time interval equal either to the shutter time preselected on said shutter time setting means, or to the faster limit of said flash exposure time range, or to the slower limit of said flash exposure time range when said shutter time setting means is set in a position providing a shutter time either within, or on the faster side of, or on the slower side of said flash exposure time range respectively,
c. second timing means for generating voltage capable of attaining said critical level in a time interval equal to a particular exposure time adapted for use flash photography only,
d. shutter control means selectively responsive to the outputs of said first and said second timing means for controlling the period of actuation of the shutter of said camera, and
e. a switching network associated with said first and said second timing means upon response to the first and second levels supplied from said level modifying means for selecting either said first or said second timing means for operative connection with said shutter control means.

7. A flash photographic exposure time bracketing device for forming an exposure time for flash photography in automatic response to an attainment of the voltage of a main capacitor of a flash unit to a critical level comprising;
a. a power source,
b. exposure time setting means arranged to provide a range of exposure times wider than a possible flash exposure time range,
c. variable first timing resistor means adjustable in automatic response to the setting of said exposure time setting means,
d. second time resistor means having a resistance value corresponding to the faster limit of said flash exposure time range,
e. third timing resistor means having a resistance value corresponding to the slower limit of said flash exposure time range,
f. first switching means connected between said power source and said first timing resistor means and responsive to said attainment of the voltage of said main capacitor to said critical level for rendering operative said first timing resistor,
g. second switching means connected between said power source and said second timing resistor means and responsive to said attainment of the voltage of said main capacitor to the critical level for rendering operative said second timing resistor means,
h. third switching means connected between said power source and said third timing resistor means and responsive to said attainment of the voltage of said main capacitor to the critical level for rendering operative said third timing resistor means,
i. applying means for selectively applying said charg-termination signal to said first, second and third switching means,
j. capacitor means connected to all of said first, said second and said third timing resistor means to constitute a first, second and third timing circuits respectively, and
k. shutter control means selectively responsive to the output of said first, said second and said third timing circuits for controlling the period of actuation of the shutter of said shutter.

8. A flash photographic exposure time range bracketing device according to claim 7, wherein said applying means is a single pole three throw switch having a central pole moveable together with said shutter time setting means, and having three fixed poles cooperative with said central moveable pole in such a manner that when said exposure time setting means is set to a position providing an exposure time either within, or on the faster side of, or on the slower side of said flash exposure time range, said central pole is in contact with first, second and third poles respectively.

9. A flash photographic exposure time range bracketing device according to claim 7, wherein said first switching means is arranged to be responsive to the voltage of said power source when a day-light exposure range is rendered operative.

10. A shutter time limit device for flash light photography comprising:
a. a shutter control circuit for controlling the closing of the shutter;
b. a shutter time setting means for setting a desired shutter time;
c. a first shutter time limit means functionally engaged with said shutter time setting means so as to operate said shutter control circuit with the shutter time value set by means of the said shutter time setting means;
d. a second shutter time limit means for operating said shutter control circuit with the maximum synchronizable shutter time with the flash light photography necessary for obtaining a proper exposure at the time of taking a photograph under flash light;
e. a third shutter time limit means for operating the shutter control circuit with a certain determined shutter time value longer than said maximum shutter time value for day-light synchronization photography;
f. a change-over selecting means functionally engaged with said shutter time setting means so as to select said second shutter time limit means when said shutter time setting means is set at a shutter time shorter than maximum shutter time value, said third shutter time limit means when the shutter time setting means is set at a shutter speed longer than said certain determined shutter time value and said first shutter time limit means when said shutter time setting means is set at a shutter time between said maximum shutter time value and the certain determined shutter time value, whereby in the case of flash light photography, a shutter time suited for the flash light photography can be obtained regardless of the shutter time value set by means of the shutter time setting means.

11. A shutter time limit device for flash light photography according to claim 10, wherein the first shutter time limit means includes a variable resistor.

12. A shutter time limit device for flash light photography according to claim 10, wheren the second and the third shutter time limit means respectively includes a fixed resistor presenting a proper resistance value.

13. A shutter time limit device for flash light photography comprising:
a. a shutter time setting means for setting a desired shutter time;
b. a shutter time limit circuit, said circuit being functionally engaged with said shutter time setting means and presenting a variable resistor whose resistance value changes in accordance with the set shutter time value, a first fixed resistor with the resistance value corresponding to the maximum shutter time value necessary for the synchronization in case of the flash light photography, a second fixed resistor with the resistance value corresponding to a certain determined shutter time value longer than said maximum shutter time value and capacitor means for composing timing circuit together with those resistors;
c. a shutter control circuit responsive to the output of said timing circuit so as to close the shutter after the lapse of the time determined by means of said timing circuit;
d. switching means respectively connected to said resistors, charging paths to said capacitor being made through the resistor connected to said switching means when said switching means are closed; and
e. a change-over selecting means functionally engaged with said shutter time setting means so as to selectively operate said switching means in accordance with the range of the shutter time value set by means of the shutter time setting means, said means selecting the switching means connected to said first fixed resistor when the shutter time value is set shorter than the maximum shutter time value necessary for synchronization in the case of flash light photography by means of said shutter time setting means, the switching means connected to the second fixed resistor when the shutter time value is set longer than said determined shutter time value and the switching means connected to said variable resistor when the shutter time value is set at a value between maximum shutter time value and said determined time value.

14. A shutter time limit device for flash light photography according to claim 13, wherein the switching means respectively responsive to the charge completion signal from the flash light device whereby the switching means selected by the change-over means operates.

15. A shutter time limit device for flash light photography comprising:
A. a flash light device, said flash light device including:
  a. an energy storing means for storing the flash light energy,
  b. a detecting means for detecting the flash light energy level stored in said energy storing means, said detecting means producing the charge completion signal with a certain determined energy level, when a certain determined flash light energy is stored in the above-mentioned energy storing means,
  c. a change-over selecting means for selecting either the fixed shutter time mode for flash light photography or the auto-shutter time limit mode,
  d. a level converting means functionally engaged with the selecting operation of said change-over selecting means so as to convert the output level of said detecting circuit either into the first level or into the second level; and
B. a camera body, including:
  a. a shutter time setting means for setting the desired shutter time,
  b. a fixed shutter time forming means for forming a certain determined shutter time for the flash light photography,
  c. a shutter time limit means functionally engaged with said shutter time setting means so as to form a shutter time value determined in advance when the shutter time is set within the range between the determined shutter time upper limit value and the determined shutter time lower limit, said shutter time upper limit value when the shutter time is set higher than said shutter time upper limit and said shutter time lower limit value when the shutter time is set lower than said shutter time lower limit,
  d. a switching circuit connected with said fixed shutter time forming means and the shutter time limit means, said circuit responsive to the first and the second level of said level converting means so as to select said fixed shutter time forming means when the output of said level converting means is at the first level and said shutter time limit means when the output of said level converting means is at the second level,
  e. a shutter control circuit connected to the said fixed shutter time forming means and said shutter time limit means so as to respond to the output of the means selected by said switching circuit for controlling the shutter.

16. A flash light photography shutter time limit device for forming the shutter time for the flash light photography by means of the charge completion signal from the main capacitor for storing the flash light energy of the flash light device comprising:
a. a current source;
b. a shutter time setting means for setting the desired shutter time value;
c. a variable resistance means functionally engaged with said shutter time setting means so as to present a resistance value corresponding to the set shutter time value;
d. a first resistance means presenting a resistance value corresponding to the maximum time value for the synchronized flash light photography;
e. a second resistance means presenting a resistance value corresponding to a fixed shutter time value longer than said maximum shutter time value;
f. a first switching means connected between said current source and the variable resistance, said switching means switching responsive to said charge completion signal;
g. a second switching means connected between said current source and the first resistance means, said means switching in response to said charge completion signal;
h. a third switching means connected between said current source and the third resistance means, said means switching in response to said charge completion signal;
i. a transmitting means functionally engaged with said shutter time setting means so as to selectively transmit said charge completion signl either to the first, or the second, or the third switching means in accordance with the range of the shutter time value to be set;
j. a capacitor means connected with said variable resistance means, the first resistance means and the second resistance means so as to form a delay circuit; and
k. a shutter control means for controlling the closing operation of the shutter by means of the output of said delay circuit.

17. A flash light photography shutter time limit device according to claim 16, wherein the transmitting means is a contact switch having a movable contact displaceable in functional engagement with said shutter time setting means, a first fixed contact piece coming in contact with said movable contact when the shutter time value set by means of said shutter time setting means is shorter than said maximum shutter time value, a second fixed contact piece coming in contact with said movable contact when the shutter time value set by means of said shutter time setting means is longer than said determined shutter time value, and a third fixed contact piece coming in contact with said movable contact when the shutter time value set by means of said shutter time setting means is in the range between said maximum shutter time value and said determined shutter time value.

18. A flash light photography shutter time limit device according to claim 16, wherein the first switching means switches in accordance with the voltage of the current source in the case of day-light photography.

19. A shutter time limit device for flash light photography comprising:
a. a shutter control circuit for controlling a closing operation of the shutter;

b. a shutter time setting means for setting a desired shutter time;

c. a first shutter time limit means functionally engaged with said shutter time setting means so as to operate said shutter control circuit with the shutter time value set by said shutter time setting means;

d. a second shutter time limit means for operating said shutter control circuit with a certain fixed synchronizable shutter time with the flash light photography necessary for obtaining a proper exposure at the time of taking a photograph under flash light; and e. a selecting means, adapted to cooperate with said shutter time setting means, for selecting said second shutter time limit means when said shutter time setting means is set at a shutter time shorter than said fixed synchronizable shutter time value.

20. A shutter time limit device according to claim 19 in which said first shutter time limit means becomes operative in response to the charge completion signal from the flash light device.

21. A shutter time limit device according to claim 19 in which said second shutter time limit means becomes operative in response to the charge completion signal from the flash light device.

22. A shutter time limit device for flash light photography comprising:

A. a flash light device, said flash light device including:

a. an energy storing means for storing the flash light energy, b. a detecting means for detecting the flash light energy level stored in said energy storing means, said detecting means producing the charge completion signal, when a certain determined flash light energy is stored in the energy storing means, c. a change-over selecting means for selecting either the fixed shutter time mode for flash light photography or the auto-shutter time limit mode, and d. a converting means functionally engaged with the selecting operation of the change-over selecting means to convert the charge completion signal of the detecting circuit either into the first electrical signal or into the second electrical signal;

B. a camera body, including:

a. a shutter time setting means for setting the desired shutter time, b. a fixed shutter time forming means for forming a certain determined shutter time for the flash light photography in response to said first electrical signal, c. a shutter time limit means functionally engaged with said shutter time setting means so as to form a shutter time value determined by said shutter time setting means when said shutter time is set longer than a certain fixed synchronizable shutter time value, said fixed synchronizable shutter time value when the shutter time is set shorter than said fixed synchronizable shutter time value, said means operating in response to the second electrical signal, and d. a shutter control circuit connected to said fixed shutter time forming means and said shutter time mode or the auto shutter time limit mode selected by said change-over selecting means.

23. A shutter time limit device according to claim 22, in which said fixed shutter time forming means contains a second switching means which selects the fixed shutter time forming means in response to the first electrical signal.

24. A shutter time limit device according to claim 22 in which said shutter time limit means includes a second switching means which responds to the second electrical signal whereby the shutter time limit means is selected.

25. A shutter time limit device for flash light photography comprising:

a. a shutter control circuit for controlling a closing operation of the shutter;

b. a shutter time setting means for setting a desired shutter time;

c. a first shutter time limit means functionally engaged with said shutter time setting means so as to operate said shutter control circuit with the shutter time value set by said shutter time setting means;

d. a second shutter time limit means for operating said shutter control circuit with a certain fixed determined shutter time with the flash light photography, necessary for obtaining a proper exposure at the time of a day-light synchronization photography; and e. selecting means, adapted to cooperate with said shutter time setting means, for selecting said second shutter time limit means when said shutter time setting means is set at a shutter time longer than said certain fixed determined shutter time.

26. A shutter time limit device according to claim 25 in which said first shutter time limit means becomes operative in response to the charge completion signal from the flash light device.

27. A shutter time limit device according to claim 25 in which said second shutter time limit means becomes operative in response to the charge completion signal from the flash light device.

28. A shutter time limit device for flash light photography comprising:

a. a shutter control circuit for controlling the closing operation of the shutter;

b. a shutter time setting means for setting a desired shutter time;

c. shutter time limit means for operating said shutter control circuit with a certain synchronizable shutter time longer than a maximum synchronizable shutter time; and d. detecting means adapted to cooperate with said shutter time setting means for detecting a shutter time set by said shutter time setting means, and select to operate said shutter time limit means when said shutter time setting means is set at a shutter time shorter than said maximum synchronizable shutter time.

* * * * *

UNITED STATES PATENT OFFICE
CERTIFICATE OF CORRECTION

Patent No. 4,083,059      Dated April 4, 1978

Inventor(s) TOKUICHI TSUNEKAWA, ZENZO NAKAMURA, et al

It is certified that error appears in the above-identified patent and that said Letters Patent are hereby corrected as shown below:

In the heading of the patent, [75] should read as follows:

[75]   Inventors:   Tokuichi Tsunekawa, Yokohama; Zenzo Nakamura, Urawa; Tetsuya Taguchi, Kawasaki; Masanori Uchidoi, Yokohama; Hiroshi Aizawa, Machida; Takashi Uchiyama, Yokohama, all of Japan Signed and Sealed this Twenty-fifth Day of July 1978

[SEAL]

Attest:

RUTH C. MASON
*Attesting Officer*

DONALD W. BANNER
*Commissioner of Patents and Trademarks*